H. T. HERR, J. R. GROVES & D. H. FOREMAN.
DUMPING CAR.
APPLICATION FILED DEC. 27, 1905.
900,368.
Patented Oct. 6, 1908.
6 SHEETS—SHEET 1.
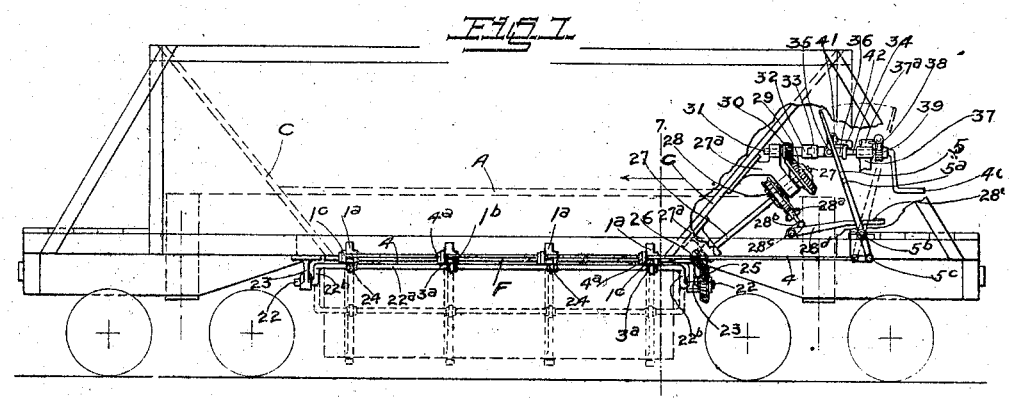
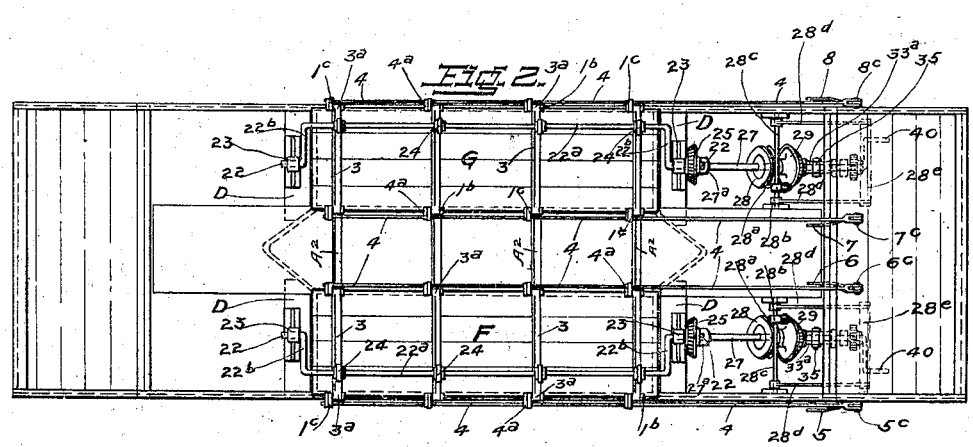
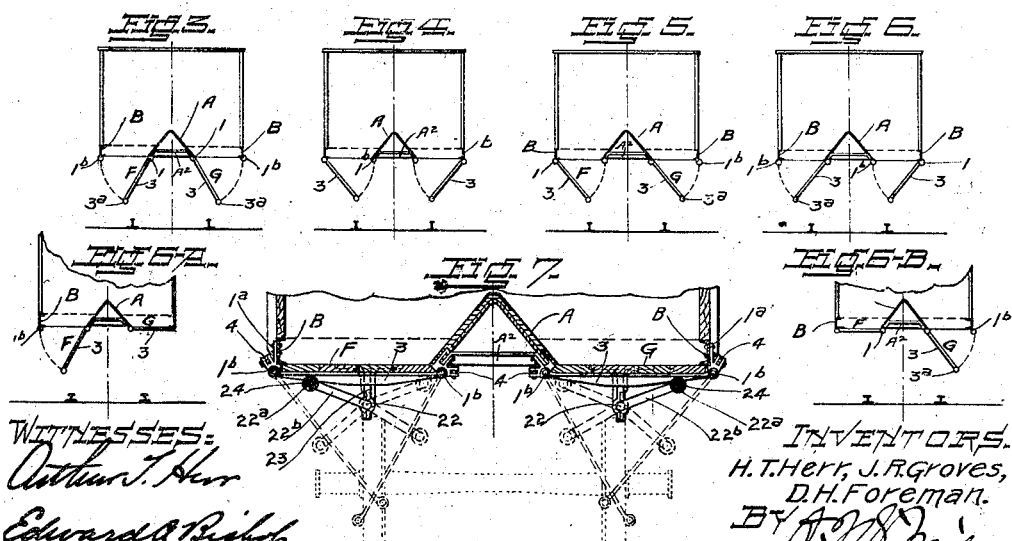
WITNESSES:
INVENTORS.
H. T. Herr, J. R. Groves,
D. H. Foreman.
BY
ATTORNEY.

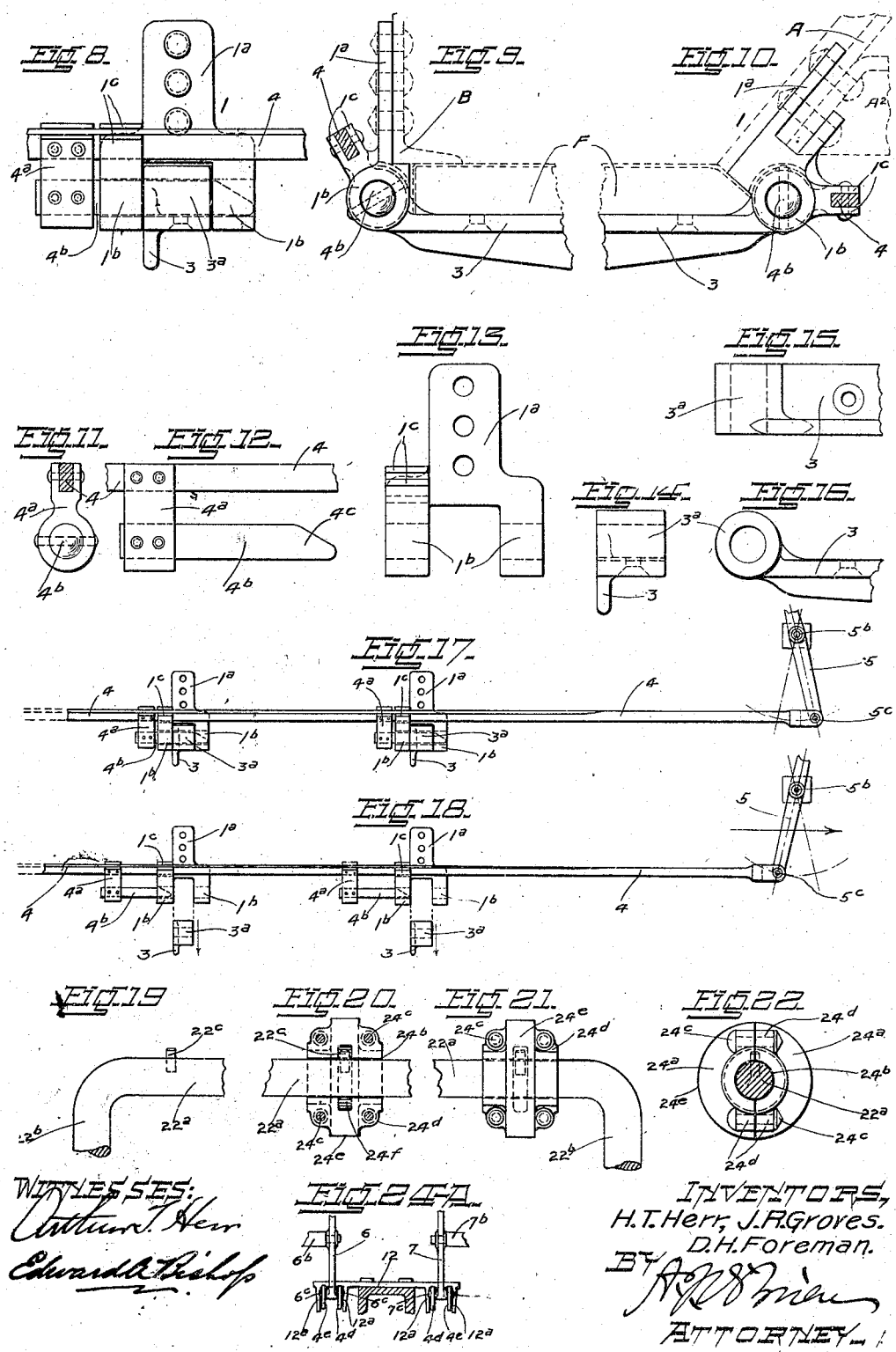

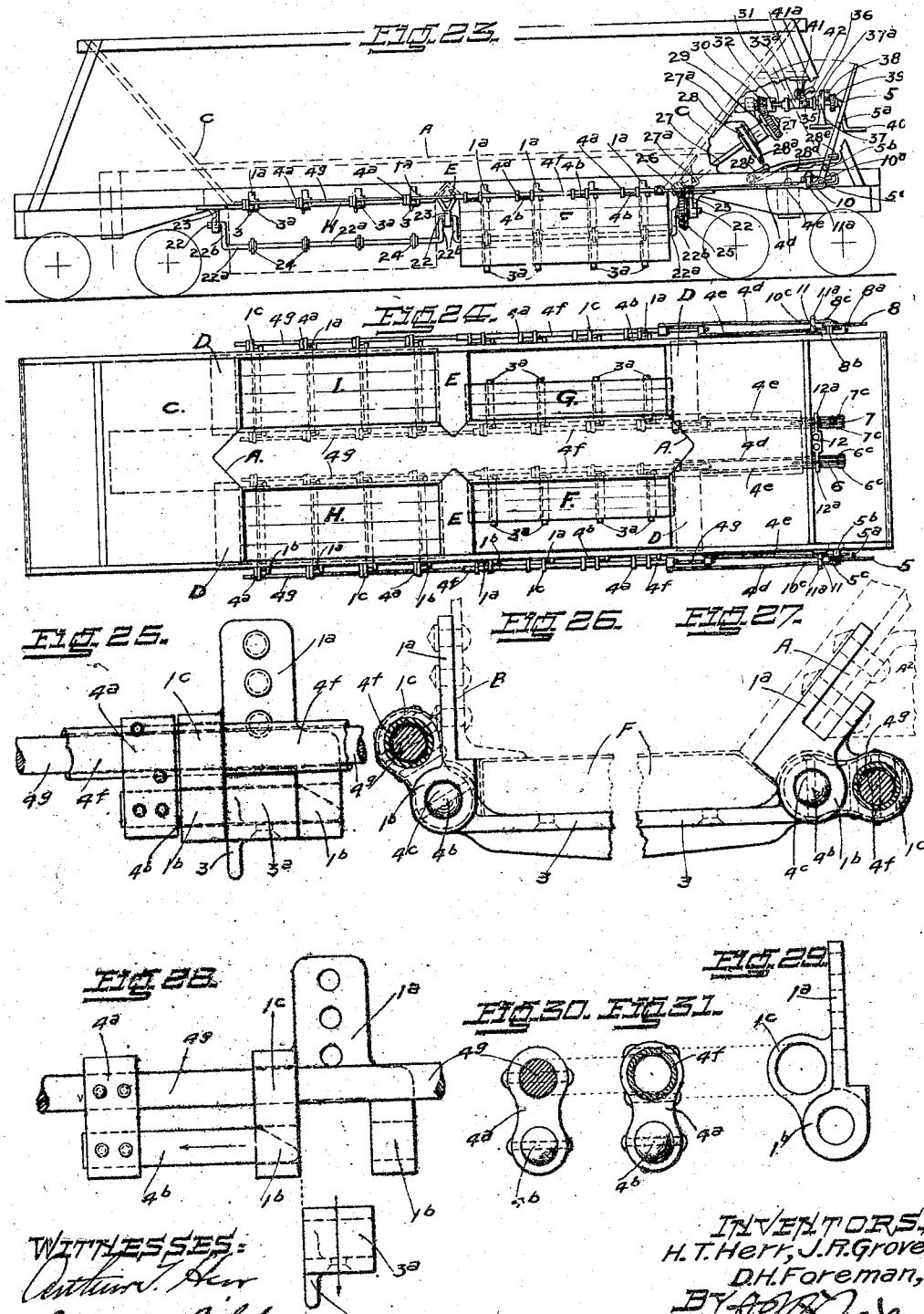

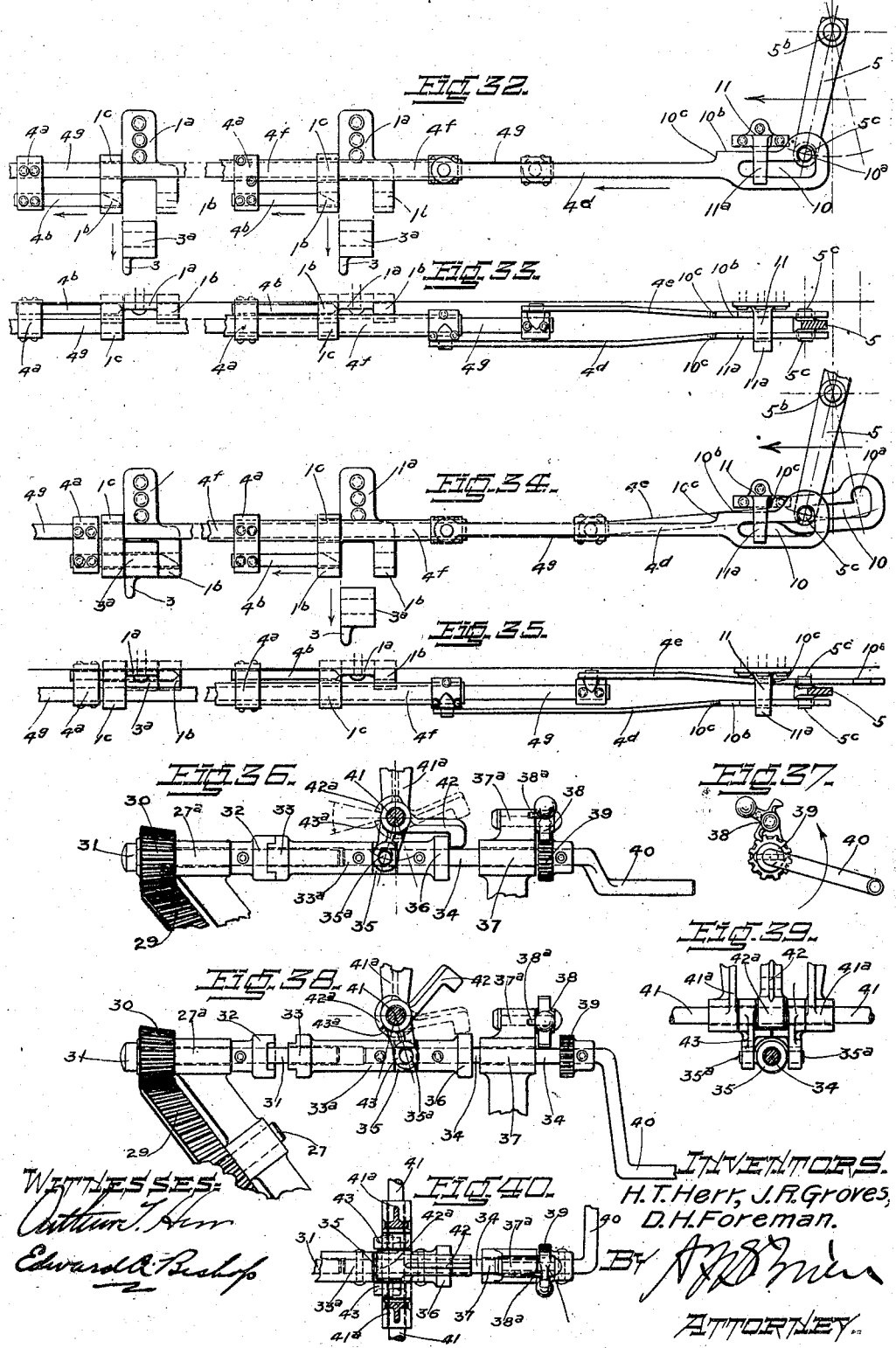

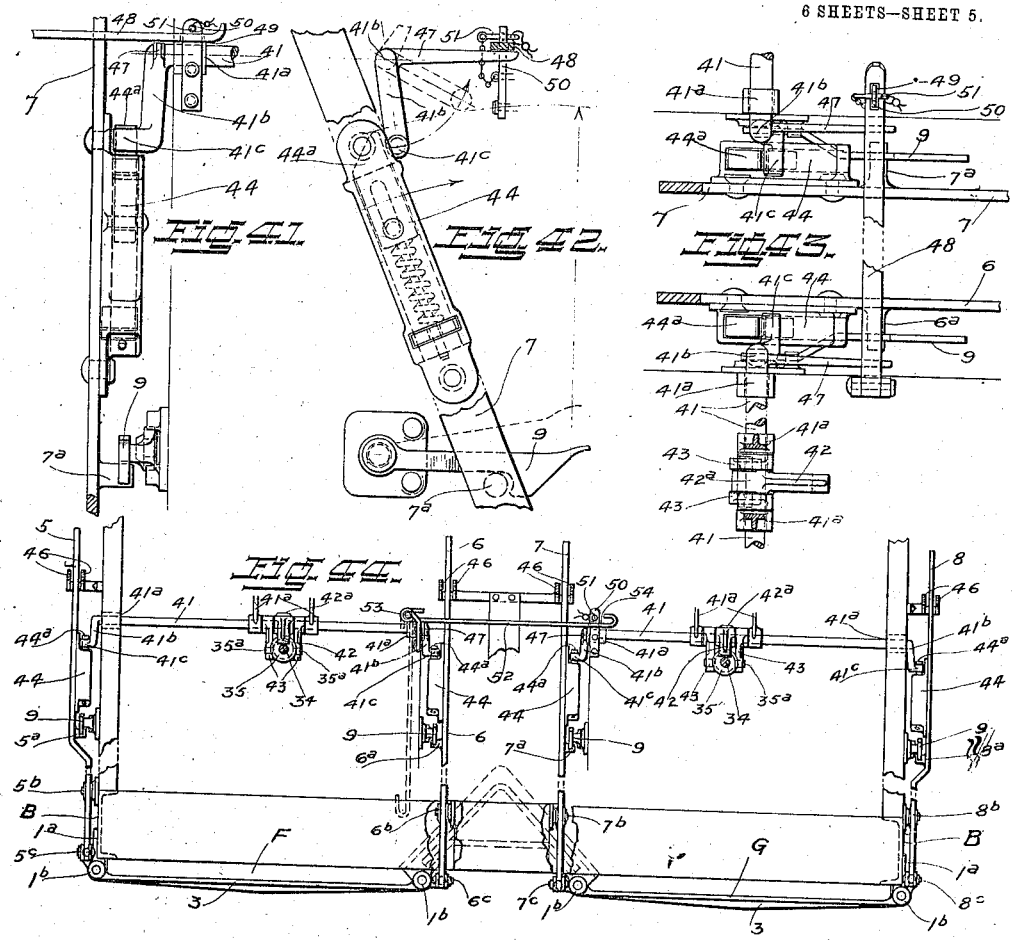

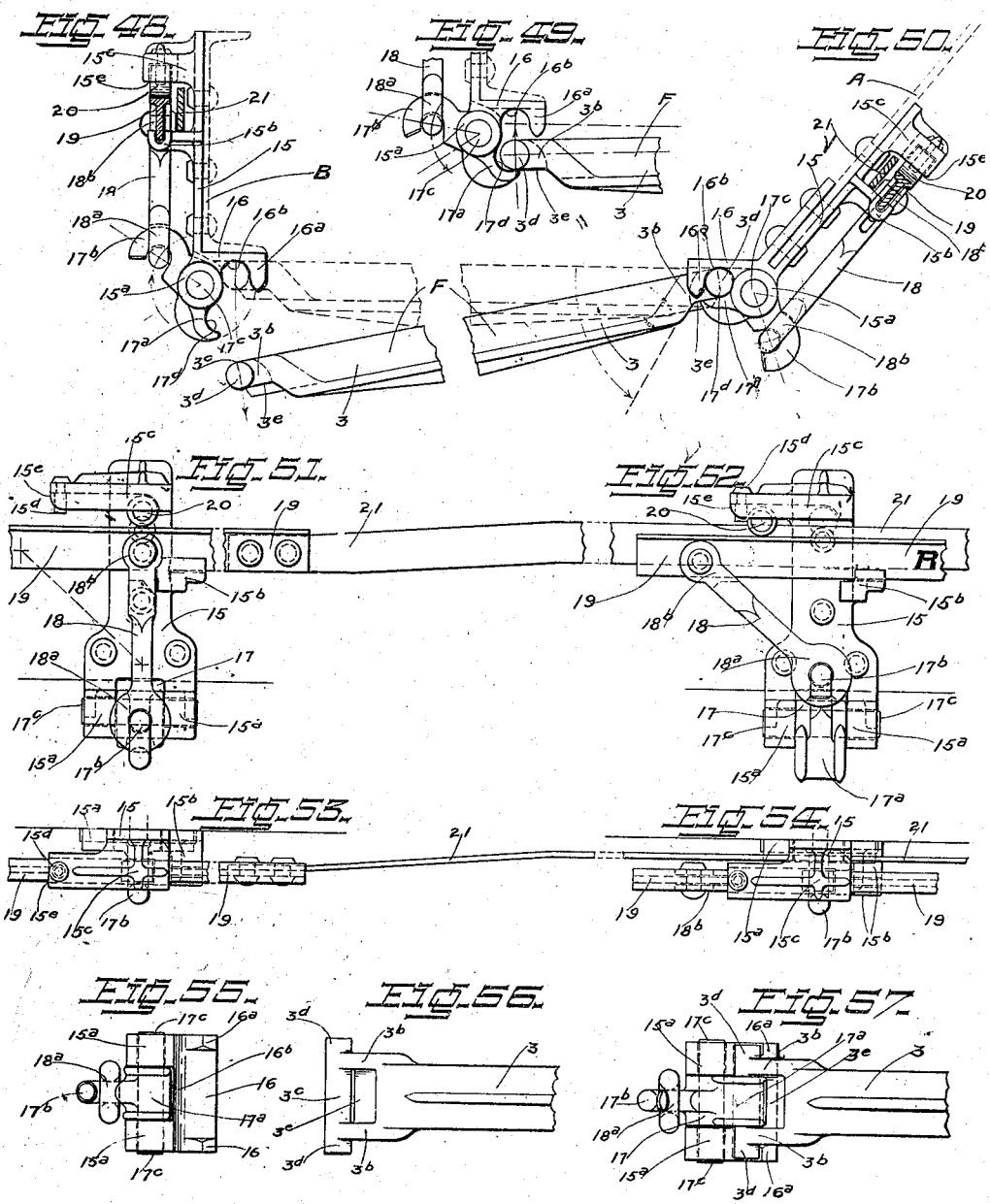

UNITED STATES PATENT OFFICE.

HERBERT T. HERR, JAMES R. GROVES, AND DAVID H. FOREMAN, OF DENVER, COLORADO, ASSIGNORS, BY DIRECT AND MESNE ASSIGNMENTS, TO THE HERR DUMP CAR COMPANY, OF DENVER, COLORADO, A CORPORATION OF COLORADO.

DUMPING-CAR.

No. 900,368.

Specification of Letters Patent.

Patented Oct. 6, 1908.

Application filed December 27, 1905. Serial No. 293,490.

*To all whom it may concern:*

Be it known that we, HERBERT T. HERR, JAMES R. GROVES, and DAVID H. FOREMAN, all citizens of the United States, residing in the city and county of Denver and State of Colorado, have invented certain new and useful Improvements in Dumping-Cars; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in dumping-cars, and is more particularly adapted to the constructive type of dump car body having a centrally disposed longitudinal truss beam or "a frame", with end floors inclined downwardly, at a suitable angle from the ends, to the central portion of the car body; on to the bottom of which are secured two or more longitudinally hinged dumping or discharge doors.

A novel and important feature embodied in our invention, which we believe to be specifically new, and a radical departure from existing details in this class of construction, is the means whereby we secure the discharge doors to the bottom of the car body with a hinge-lock or hinge-locking cam by the use of which we are enabled to release the discharge doors from either their inner or outer edges, while the engaged members upon the opposite sides of the doors act as a hinge, around which the released doors swing, either inwardly or outwardly as the case may be. This arrangement enables us to discharge the entire load upon either side of the track, or between the rails of the track, or in part upon either side of the track, or in part between the rails of the track and upon either side of the track as conditions may require. Our construction further affords in either of these several dumping positions a maximum area of open dumping space enabling us thereby to discharge the entire load very quickly, if so desired, entirely automatically, by gravity, requiring no hand shoveling of any portion of the load.

The hinge locking cam construction embodies a further novel and important feature, inasmuch as it will take up a limited amount of sag in the doors, liable to arise in practice, due to warping, etc., or to failure of the winding mechanism to carry the doors completely home, since the locking cams pick up and force the doors home under a powerful leverage, effecting a positive and tight closure of the same.

Our invention comprises a winding mechanism whereby the released doors may be lifted and replaced in position, and properly secured by the hinge-locking cams for reloading the car. Considering the several positions into which the doors may be dropped, from any of which they can be replaced by this winding attachment, the construction is comparatively quite simple, efficient and durable.

Our invention further comprises a foot-brake mechanism, mounted upon the winding mechanism whereby the operator is enabled to fully control the speed with which the loaded doors are permitted to drop, thereby avoiding the danger of damaging the construction from the impact of the heavily loaded doors, were they permitted to drop freely upon the parts. This foot-brake attachment also enables the operator to govern the distance to which the doors are permitted to open, and with an interlocking pawl and ratchet suitably mounted upon the winding mechanism, secure them in any partly opened position, when desired to particularly control the discharge of the material being dumped.

Our invention further comprises a novel combined construction, whereby the initial movement of the door-releasing operating levers automatically throws the hand-crank winding mechanism out of engagement with the winding gear connected with the discharge doors, rendering the crank-winding mechanism, entirely inoperative for the time being, for the purpose as shall hereinafter be fully set forth.

We further provide for positively securing the door-releasing operating levers, automatically, in their closed positions, for the purpose of preventing the accidental release of the door hinge-locking cams, and discharge of the load while in transit.

Our invention further comprises a combined construction whereby we are enabled to positively interlock, by a single car-seal or padlock, all operating levers, against unauthorized manual interference or malicious tampering.

Additional details as to the construction and operative functions of our invention will be more fully hereinafter set forth.

Reference is to be had to the accompanying drawings forming a part of this specification in which:

Figure 1 is a reduced scale, outline, side elevation of the preferred type of a two-door dump car, showing in general outline our construction. The centrally disposed discharge doors being shown in the raised or closed position; the released or open position of the same being shown in broken lines. A portion of the side of the car at the operative end is broken away in this figure to more clearly show the arrangement of the operating levers and winding and brake mechanism of our invention. Fig. 2 is an inverted plan view corresponding with Fig. 1. Figs. 3, 4, 5, 6, 6$^a$ and 6$^b$ are reduced scale outline diagrams of a car body in cross-section through the discharge doors, illustrating the several positions into which the doors may be placed upon a car equipped with our improvement. Fig. 7 is an enlarged scale, cross-section of the car body, taken on section line 7—7 of Fig. 1, viewed in the direction of the arrow, showing the central longitudinal truss beam and the side channel beams, the attached discharge doors, secured by the hinge-locks, upon their inner edges to the sides of the central truss beam, and upon their outer edges to the side channel beams and showing also a portion of the door raising crank shaft. Fig. 8 is a detail view in side elevation of one form of the hinge-lock, designed to be secured to the side channel of the car body, being shown in engagement with the end of a door-beam hinge. Fig. 9 corresponds with Fig. 8, showing the hinge-lock in end elevation and a part of the door-beam hinge in side elevation. Fig. 10 is a corresponding view of the door-beam hinge and hinge-lock designed to be secured to one side of the central truss beam. Fig. 11 is a detail end elevation, and Fig. 12 is a corresponding side elevation of one of the joint pins of the hinge-lock, with the connecting yoke piece, whereby the pin is secured to a section of the connecting bar as shown in Fig. 8. Fig. 13 is a detached detail view in front elevation of the hanger portion of the hinge-lock shown in Fig. 8. Figs. 14 and 16 are respectively, end and side elevations, and Fig. 15 a corresponding plan view, of an end of a door-beam hinge. Fig. 17 is a detail side elevation of a portion of the hinge lock operating lever and the connecting bar, carrying the joint pins, showing the hinge-locks in engagement with the door beam hinge. Fig. 18 is a corresponding view with the parts in position showing the door-beam hinge released. Fig. 19 is a detail view of a part of the door raising crank shaft, showing a roller retaining stud inserted in same. Figs. 20, 21 and 22 are respectively detail views in vertical section and peripheral and side elevation, of a split anti-friction roller, mounted upon the door-raising crank shaft. Fig. 23 is a reduced scale outline side elevation of a four door dump car, showing in general outline our attached construction, with the pair of doors adjacent the operative end of the car in the released or dumping position, and with the other pair of doors shown in the raised or closed position. Fig. 24 is a plan view corresponding with Fig. 23. Fig. 24$^A$ is a side elevation in detail and on an enlarged scale of a modified construction of interlocking guard 12 engaging the slotted heads connected with the central operating levers 6 and 7, the same being shown in plan in Fig. 24 but on a smaller scale. Fig. 25 is a detail view in side elevation of a construction of hinge-lock particularly adapted for use in connection with a four door car, showing the engaged end of a door-beam hinge. Fig. 26 corresponds with Fig. 25, showing the hinge-lock in end-elevation, and the engaged door-beam hinge in side elevation. Fig. 27 is a corresponding view of the door-beam hinge, and hinge-lock designed to be secured to one side of the central truss beam. Fig. 28 is a detail side elevation of the hinge-lock in disengaged position showing the door-beam hinge, released. Figs. 29, 30 and 31 are details in end elevation of parts of the hinge-lock shown in Figs. 25 and 28. Figs. 32 and 33 are respectively side elevation and plan views of a portion of the operating lever, with slotted connecting bars adapted to operate the side hinge-locks of a four door car, either in unison or separately as may be desired, dropping the doors accordingly. In these figures the construction is shown as being operated to release all the side hinge-locks of both the doors shown adjoining the lower side of Fig. 24. Figs. 34 and 35 illustrate the same detail construction shown in Figs. 32 and 33, operated however, to release only the side hinge-locks of the door adjacent the operative end of a four-door car, corresponding with the positions of the operative construction shown in Figs. 23 and 24. Fig. 36 is a side elevation of the crank-winding mechanism, in operative position, corresponding with the position of the same construction shown in reduced scale in Fig. 1. Fig. 37 is a detail elevation of a universal pawl and ratchet construction embodied in the crank winding mechanism shown in Fig. 36. Fig. 38 is a similar view of the crank-winding mechanism shown in Fig. 36, disengaged, however, from the winding gear; corresponding with the position of the same construction shown in reduced scale in Fig. 1.

23. Figs. 39 and 40 are respectively side elevation and plan of a part of the automatic disengaging mechanism of the crank-winding construction. Figs. 41 and 42 are respectively front and side elevations of a detail portion of the hinge-lock operating lever, showing also a spring-latch designed to engage a rock-shaft crank which carries the automatic gear releasing mechanism. These figures also show the safety hook coöperating with the operating lever, and also a locking-arm formed integrally upon the rock shaft designed to coöperate with a universal sealing or locking bar. Fig. 43 in the upper half of the figure, is a plan view of the construction shown in Figs. 41 and 42 being a part of the construction pertaining to the operation of the doors shown on the upper half of Fig. 24 and in the lower half of the figure being a corresponding part of the construction pertaining to the operation of the doors shown on the lower half of Fig. 24. Fig. 44 is a detail reduced scale, transverse elevation, of the complete gear-releasing locking and sealing construction, corresponding with that shown in part in Figs. 41, 42 and 43, mounted upon the operative end of the car, adjacent to and coöperating with the lever and winding mechanism shown in Figs. 1, 2, 23 and 24. Figs. 45, 46 and 47 are respectively end and side elevation, and plan view of a bracket-housing suitably secured adjacent the rock-shaft cranks, forming a stop for the same and the operating levers, and a housing for the spring-latch mounted upon the operating levers, as indicated by broken lines in Fig. 46. Fig. 48 is a detail end elevation of the hinge-locking cam, being an alternative construction of the hinge-lock shown in Figs. 25, 26 and 27, designed to be secured to the side channel of the car body. In this figure the door-beam hinge is shown in released position. Fig. 49 is a detail of the locking cam, showing the function of the cam-jaw in picking up a sagging door. Fig. 50 is a detail end elevation of the hinge-locking cam designed to be secured to one side of the central truss beam. In this figure the locking-cam is shown in engagement with the door-beam hinge. Fig. 51 is a detail side elevation of the hinge locking cam, shown in position engaging the door beam hinge, corresponding with Figs. 50, 53, 57 and 58. Fig. 52 is a similar view, showing the cam in disengaged position, corresponding with the position shown in Figs. 48, 54 and 55. Figs. 53 and 54 are plan views respectively, of the construction shown in Figs. 51 and 52. Figs. 55 and 56 are inverted plan details, respectively, of the hinge-locking cam, and the end of the door-beam hinge. Fig. 57 is an inverted plan detail showing the locking cam in engagement with the door-beam hinge, corresponding with Figs. 51, 53 and 58. Fig. 58 is a detail end elevation of the locking-cam shown in engagement with the door-beam hinge, and corresponding with the position shown in Figs. 50, 51, 53 and 57.

Similar reference characters throughout the description indicate corresponding parts in the several figures.

In this present application we describe and illustrate, merely in a general way, a construction of dump car adapted to embody our invention referring specifically to only so much of the car body construction as is necessary to enable one skilled in the art, to fully and clearly comprehend the construction, application and coöperation of our invention.

Referring to the drawings, briefly stated, we provide in the car body construction a central longitudinal truss-beam, being in cross section an A-shaped plate member A, Fig. 7, the lower edges of which are transversely supported by a number of tie-bars $A^2$, formed by angle bars, secured to the sides thereof, on a line with the door beam hanger locks as shown in Figs. 2 and 7, and side channel beams or car sills B. B.; and floors C. C., Figs. 1, 23 and 24, inclined downwardly at a suitable angle from the ends of the car body toward the central portion thereof, at the termination whereof are suitably disposed transverse beams D. D. Figs. 1, 2, 23 and 24, thus forming in the central bottom portion of a two-door car body between the sides of the central truss-beam member and the adjacent respective side sills and cross-beam members, two rectangular openings of suitable area; while in a four-door car body these somewhat elongated openings are bisected centrally by transverse A-shaped truss-beams E E, as shown in Figs. 23 and 24, thus forming four rectangular openings of a proportionally increased total area. These openings in the two-door car are fitted with suitable discharge doors, F. G. Figs. 1 and 2, and in the four-door car with four discharge doors, F, G H and I Figs. 23 and 24. It will be understood that we do not limit ourselves to this number of openings and doors, since under certain conditions a greater number of doors, with probably diminished areas of openings would be desirable. Referring to Fig. 7, we indicate in broken lines the several positions into which the doors may be dropped, also in broken lines the several corresponding positions from either of which the doors can be carried up to their respective closed positions by two longitudinally disposed crank shafts 22, 22.

In diagram Figs. 3 to $6^b$, Fig. 3 shows the doors set to discharge the load to the outer sides of the track; Fig. 4 to the inside of the track; Fig. 5 partly to the right hand side and partly between the track rails; Fig. 6 partly to the left hand side and partly between the track rails; Fig. $6^a$, with the door F released, and the door G closed; Fig. $6^b$ with the door G released and the door F closed; and Figs. 1 and 7 all doors in closed position.

We secure the doors to the car body by a suitable number of hinge-locks 1 1 shown in enlarged detail in Figs. 8 to 16 inclusive, comprising the main hanger, secured by a flange portion $1^a$ to the side channels B B and the central truss beam A. Cast integrally with this flanged base and extending downwardly from the sides thereof, are two longitudinally bored joint-pin lugs $1^b$, upon the top of one of which is formed a longitudinally slotted boss $1^c$ which serves as a guide or carrier for a connecting bar 4, mounted upon which, adjacent the hinge-lock hanger is a yoke-piece $4^a$ carrying a joint-pin $4^b$, designed to register with, and be engaged by the bored hanger lugs $1^b$.

The hinge lock shown in Fig. 10 is substantially a duplicate of that shown in Figs. 8 and 9 described above, excepting that on this the flanged base $1^a$ and the bored joint-pin lugs $1^b$ are disposed relatively at a slightly different angle, and the flanged part $1^a$ is formed double or as a jaw-flange, designed to be secured to, and conform with the sloping sides of the central truss beam A.

On to the under sides of the discharge doors F and A are secured a corresponding number of transversely disposed door beam hinges 3 3, the ends of which, projecting slightly beyond the sides of the doors, are formed into joint-pin eyes, or hinge ends $3^a$, $3^a$, designed to register with the slotted spaces formed between the bored hanger lugs $1^b$, $1^b$ of the hinge-locks, in which position they are engaged by the coöperating joint-pins $4^b$, as shown in Figs. 8, 9, 10 and 17.

Referring to Fig. 12 it will be seen that the end of the joint-pin $4^b$ is tapered at a suitable angle $4^c$ to permit of its taking-up to some extent, a sagging door hinge $3^a$, when the pins are thrust home, and engage the hinge end between the hanger lugs $1^b$, by moving the connecting bars 4, 4, 4, 4. These bars are suitably disposed, one each adjoining the side sills B, B of the car, and two beneath the central truss beam A, each mounted in their respective hanger slots $1^c$, and carrying the several joint-pins $4^b$, as shown in Figs. 2 and 7. The extreme end of each bar 4, 4, 4, 4 adjoining the operative end of the car is jointed, respectively, to vertically disposed operating levers 5, 6, 7 and 8, as shown in Figs. 1, 2 and 44, each mounted on a suitable bearing $5^b$, $6^b$, $7^b$ or $8^b$. Upon the side of each lever, above the bearing is formed, respectively, a stud $5^a$, $6^a$, $7^a$ or $8^a$, each of which is engaged by a self-acting retaining hook 9, 9, 9, 9, as shown in Figs. 41, 42, 43 and 44, positively securing the levers in the position corresponding with the normally engaged position of the joint pins $4^b$, thereby preventing the accidental disengagement of the joint-pins, and release of the discharge doors.

The mechanism hereinbefore described comprises the entire construction required to retain two discharge doors in their closed positions, or to manipulate the attachments in a way to effect any of the several dumping positions shown. To release the doors and discharge as shown in Fig. 3, the operator disengages the respective retaining hooks 9, 9, and moves the operating levers 5 and 8 from the position shown in Fig. 1, in full lines, to the position shown in broken lines, thereby withdrawing the respective joint-pins $4^b$, as shown in Fig. 18, releasing the corresponding door beam hinges $3^a$ upon the outer sides of the doors. The pins and hinges upon the inner sides of the doors, remaining in engagement, as shown in Fig. 10, form the hinge joint around which the discharge doors swing, as shown in Fig. 3. From the above it will be readily comprehended how the several discharge positions may be effected, by moving the corresponding operating levers 5, 6, 7 or 8.

We provide means whereby the doors can be raised from any of the discharged positions shown, and secured to the car body, ready for reloading, as will be hereinafter fully described.

In Figs. 23 and 24 we illustrate a four-door car body fitted with discharge doors F, G, H and I. It will be understood that the construction above described in connection with a two-door car, is also adapted to secure four or more doors, or release them into either of the several discharge positions shown. It is, however, sometimes desirable in practice, in using a four-door car, to dump but one door on a side at a time, as F or H, or vice versa, or in transverse pairs as F and G, as shown in Figs. 23 and 24, as when discharging coal or ores over a short bin or chute. It is also important that the operator be enabled to release the desired doors without leaving his position on the operative end of the car. We provide means whereby this can be done. Upon the sides of the lower or short arm of the operating levers 5, 6, 7 and 8 are formed connecting-bar studs $5^c$, $6^c$, $7^c$ and $8^c$ engaging which are the slotted heads of two connecting bars $4^d$ and $4^e$ Figs. 32 to 35 in which the longitudinal slots 10, are of a length equal to the clear travel of the lever studs. The outer end of this slot terminates on the upper side in a circular recess $10^a$ adapted to receive and engage the lever stud, Fig. 32. Upon the upper side of the slotted head is formed a longitudinal plane $10^b$, terminating on the end adjoining the connecting bar in a transverse, angular, locking-lug face $10^c$. Secured to the side channel beams B, immediately above and overhanging the slotted bar-heads connected with the operating levers 5 and 8, are angular, interlocking brackets the horizontal part 11, of which forms a stop designed to engage the lug 10° of the slotted head, and also to act as a lock-guard for the plane 10ᵇ, the depending ends 11ᵃ forming guards, securing the slotted heads upon their coöperating lever studs. A modified construction of interlocking guard 12, engaging in like manner the slotted heads connected with the central operating levers 6 and 7 is shown in plan in Fig. 24, and in detail, enlarged scale, side elevation in Fig. 24ᴬ.

The connecting bars 4ᵈ and 4ᵉ are respectively, suitably secured to a joint-pin tube 4ᶠ, and a joint-pin rod 4ᵍ, Figs. 23 to 35 inclusive. As will be seen these tubes carry the joint-pins 4ᵇ coöperating with the hinge-locks engaging the hinge ends on both sides of the doors F and G, and in like manner the rods 4ᵍ carry the joint-pins coöperating with the hinge locks, engaging the hinge ends on both sides of the doors H and I. Central alinement of the joint-pins is secured by passing the end of the rods 4ᵍ adjacent the connecting bars 4ᵉ through the tubes 4ᶠ in which they take free bearing. Suitably enlarged pin-yokes 4ᵃ are secured to the tubes 4ᵇ as shown in Fig. 31, the hanger guides 1ᶜ, Fig. 29, being designed to conform to the tubes 4ᶠ and the rods 4ᵍ. To release the outer sides of the doors F and G as shown in Figs. 23 and 24, while the doors H and I remain closed, all the operating levers 5, 6, 7 and 8 being secured in the closed position shown in Fig. 1, the operators first disengage the retaining hooks 9, 9 from the levers 5 and 8, and with the toe of the shoe raise the inner slotted heads of the bars 4ᵉ and rods 4ᵍ up, into the inoperative position shown in Fig. 34, lifting the recess 10ᵃ out of engagement with the lever stud, simultaneously interlocking the lug 10ᶜ with the locking bracket 11, the recess 10ᵃ of the adjoining slotted head remaining in engagement with the lever stud. If the levers now be moved in the direction of the arrow in Fig. 34, the stud passes into the slot of the disengaged head, thereby interlocking it against longitudinal movement, and securing the doors H and I against accidental release. Meanwhile the bars 4ᵈ and slotted heads are being moved in the direction of the arrow, simultaneous with which movement the plane surface 10ᵇ of the moving head becomes interlocked under the bracket 11, thereby preventing their jumping up and accidentally releasing the studs during the movement of the levers to the position shown in Fig. 23. Enough clearance is given the parts to permit the slight radial displacement of the lever studs. Inasmuch as the bars 4ᵈ connect with the tubes 4ᶠ the joint pins 4ᵇ are withdrawn from the outer hinge ends of the doors F and G, permitting them to drop and discharge a portion of the load. The car then being moved to "spot" the doors H and I, the levers 5 and 8 meantime having been returned to the position shown in Fig. 1, the disengaged slotted heads drop by gravity into engagement with the studs. The levers are again moved in the direction of the arrow Fig. 32, carrying with them the bars 4ᵉ and rods 4ᵍ, releasing the doors H and I, and carrying the bars 4ᵈ and tubes 4ᶠ idly along. It will be understood that by first disengaging the outer slotted heads and bars 4ᵈ the doors H and I may be released first, while F and G remain closed. It will also be understood that if it is desired to release either side doors simultaneously as F and H, the lever is simply thrown with both slotted heads in engagement, as shown in Fig. 32. From the above description it will be readily comprehended that by the manipulation of certain levers, in combination with certain ones of the slotted heads, any of the several discharge positions can be effected in unison with any of the several combinations possible in the four doors. From the above it will also be seen that all doors can be entirely disengaged and conveniently moved aside, making all parts of the detail construction readily accessible to mechanics or car repairers, if necessary.

Figs. 48 to 58 inclusive illustrate a hinge-locking cam, being an alternative construction of the joint-pin hinge-locks hereinbefore described, a locking cam taking the place of the joint-pin, in engaging and supporting the discharge doors, the hinge ends of which instead of being a joint eye are formed into T-ends, adapted to register with and be engaged by the locking cam.

In the figures, 15 indicates the main hanger base, adapted to be secured either to the side channels B, B, of the car body, as in Figs. 48, 51 and 52, or in a slightly modified detail construction to the sides of the central truss beam A, as in Fig. 50. An angular hinge-engaging flange 16 is formed integral with the main hanger 15, adjoining the lower end thereof, upon the under side of which, depending from the corners, are formed two hinge engaging lugs 16ᵃ. Also cast integrally with the main hanger 15 and extending downwardly from the lower end thereof, are two bored cam supporting lugs 15ᵃ, 15ᵃ, revolubly mounted within which upon a short shaft 17ᶜ is a hinge-locking cam 17, integrally formed upon the under side of which is a hinge-engaging jaw 17ᵃ, and at nearly right angles thereto a curved crank pin arm, 17ᵇ. Upon the under side of the hanger flange 16, between the lugs 15ᵃ and 16ᵃ is formed a semicircular, transverse groove 16ᵇ, conforming to and designed to receive the round bar end of a door-beam hinge as shall be shown. A toggle link 18, formed upon the lower end into a crank-pin eye 18ᵃ, is freely jointed to the curved crank-pin arm 17ᵇ, the opposite upper jawed end 18ᵇ being jointed to a connecting bar 19. This bar is constructed, preferably, of a standard T-section, as shown in cross-section Figs. 48 and 50, and is supported at each of the hanger castings in a slotted bracket 15$^b$, cast integrally upon the main hanger 15. This bracket also forms a stop to the travel of the toggle link 18, when carried to the position shown in Fig. 51, preventing its being thrown beyond the dead-center cam-locking line, as shown. An anti-friction roller 20 is mounted upon the upper side of the connecting bar 19, in a channel housing or runway 15$^c$ cast integrally with the hanger base 15 upon the upper end thereof. This roller is secured in the runway by a lock rivet 15$^d$ inserted in the open end of the roller channel 15$^e$.

Upon the ends of the door-beam hinges 3, are formed side flange extensions 3$^b$, 3$^b$ Fig. 56, across the ends of which is formed transversely a round hinge or joint-bar 3$^c$, the ends 3$^d$, 3$^d$ of which extend slightly beyond the outer sides of the flange members. Between the end of beam 3, and the cross-bar 3$^c$, is formed a transverse rectangular opening 3$^e$. This hinge end registers with, and is engaged by the hinge-locking cam and hanger as shown in Figs. 50, 51, 57 and 58.

Let it be supposed that the connecting bar 4, Fig. 18, is connected with the end of bar 19, at the point R, Fig. 52, the construction in both figures being in the corresponding disengaged position. The discharge door F having been raised by suitable means to the position shown in Fig. 49, that of a sagging door, if the operating lever 5 be moved in the direction of the arrow Fig. 18, the toggle link 18, is carried into the upright, or cam-closing position Fig. 51, the cam-jaw 17$^a$ meanwhile having engaged, and carried the hinge joint-bar 3$^c$ up into the closed position shown in Figs. 50 and 58, into which position the round joint-bar 3$^c$ is securely interlocked within the concentric groove 16$^b$ and the coöperating, semicircular, concentric bearing face 17$^d$ of the locking-cam jaw 17$^a$. It will be observed that a powerful leverage force is brought to bear upon the cam-jaw 17$^a$ because of the closing angle, into which the toggle link 18 has been carried, thereby enabling the operator to effect a complete and thoroughly tight closure of the door. With the door-beam hinges in this closed position, the depending lugs 16$^a$ engage the outer extending ends 3$^d$ of the hinge-beam joint-bars 3$^c$, thereby forming a positive transverse tie between the central truss beam A, and the side channels B, B of the car body, across the rectangular door openings, when the doors are closed and the beam-hinges secured by the hinge-locking cams, eliminating thereby the tendency to outward bulging of the sides of a loaded car. The above hinge-locking cam construction applies to the direct manipulation of a two, four or greater number door car. This hinge-locking cam can also be used on a four-door car where it is desired to release the door singly or in transverse pairs, as explained above in connection with Figs. 23 and 24, and by the use of the slotted-head connecting bars 4$^d$ and 4$^e$ as shown in Figs. 32 to 35 inclusive. In this case we use an extension bar 21, Figs. 51 to 54, which is suitably attached to the end of the connecting bar 19, connected with the hinge-locking cams coöperating with doors H and I, Fig. 24. This extension bar 21, is carried on suitably disposed bearings upon the intermediate cam locking hangers as shown in Figs. 48 and 50, to the operative end of the car, where it is attached to the slotted-head connecting bar 4$^e$ Fig. 33 while the connecting bar 19, connected with the hinge locking cams coöperating with doors F and G, is attached to the slotted-head connecting bar 4$^d$, by which combined construction it will be seen that the operator is enabled to effect the discharge combinations hereinbefore fully set forth.

In releasing the doors to discharge the load the toggle-links 18 are thrown from the upright position Fig. 51, to the angular position Fig. 52 permitting the cam crank-pin 17$^b$ to turn upward and the cam-jaw 17$^a$ to swing from under the hinge bar 3$^c$ as shown in Fig. 48, releasing the outer side of the door, in which movement the inner hinge-locking cam Fig. 50 acts as a hinge upon which the door swings, the round joint bar 3$^c$ being interlocked within the concentric groove 16$^c$, cam-jaw bearing face 17$^d$ and the depending lugs 16$^a$, within which it takes free revoluble joint bearing, the end of the cam jaw 17$^a$ being disposed within the rectangular opening 3$^e$ of the hinge-beam, permits the hinge to swing downward over the jaw without interference of the parts, to the position indicated by the arrow and broken line in Fig. 50.

The construction whereby the released discharge doors are raised into the closed position for reloading the car is provided in duplicate, and as the parts coöperating with the door or doors upon either side of the central truss beam are identical, a description of either will apply to both.

In a two-door car, as shown in Figs. 1 and 2, a longitudinal crank shaft 22, has formed thereon a crank 22$^a$, slightly longer than the door. This crank shaft is mounted in hanger bearings 23, 23 which are secured beneath the car body adjacent the ends of the discharge door, substantially in a plane beneath the longitudinal center of the doors, as shown in Fig. 7.

In a four-door car, as shown in Fig. 23 two cranks 22$^a$, 22$^a$, are formed upon the shaft 22, corresponding with the two doors with which they coöperate, a short section of the shaft being mounted between the doors in a third hanger bearing 23, which is secured to the transverse beam E. Mounted upon the cranks 22$^a$ are a number of antifriction rollers 24, 24, corresponding with the number of hinge beams secured upon the discharge doors, which in the figure is shown to be four, this is optional, however, as a greater number may be found necessary to meet the requirements of practice. The rollers are placed in position to register with the hinge-beam irons against which they roll when the door is being raised by the crank, a separate roller plate may be used if desired. We show in Fig. 19 a retaining stud 22$^c$ whereby the roller is secured in position upon the crank shaft 22$^a$.

Figs. 20 to 22 show the roller in enlarged detail, which is made up of the parts, 24$^a$, 24$^a$ joined upon a diametrical plane parallel to the shaft engaging center 24$^b$, by suitably disposed clamping bolts or rivets 24$^c$ engaging suitable lugs 24$^d$, adjoining the hub upon both sides of the central tread 24$^e$ formed within the plane of which, of a somewhat greater diameter than the shaft engaging center, is an interior annular groove 24$^f$ designed to register with and be engaged by the retaining stud 22$^c$, thus securing the rollers in coöperative position with reference to the hinge-beam irons.

Referring to Fig. 7 it will be noted that the center line of the crank shaft 22, is particularly located with reference to the corresponding location of both the inner and outer door-beam hinges, and the length of the crank arms 22$^b$, in order to effect the universal raising of the door by the crank shaft and coöperating winding mechanism. This can be effected regardless of the position occupied by the crank prior to the releasing of the door, and whether the door be released from the inner or outer side.

Referring to Figs. 1, 2 and 23 it will be seen that the door ends swing freely between the crank arms 22$^b$ permitting the crank to assume a position beneath the same when discharged, as indicated by the several positions of the crank, and released door shown in broken lines in Fig. 7, from either of which positions the door can be carried back to the closed position by rotating the crank in the corresponding required direction. It will also be observed that the crank forms a hanger or stop for the discharged door, assuming a position at right angles thereto with the weight and forces exerted longitudinally through the crank arms 22$^b$, thereby eliminating torsional forces upon the crank shaft, by the weighted door, with the danger of giving the same a permanent "set".

Secured upon the end of the shaft 22, is a bevel gear 25, which meshes with a bevel pinion 26 mounted upon the lower end of an upwardly inclined counter-shaft 27, which is suitably supported in bearings 27$^a$, 27$^a$, adjacent the operative end of the car, disposed beneath, and at an angle conforming to the slope of the inclined end floor C. Adjoining the upper bearing a band-brake wheel 28 is mounted upon the shaft 27, and upon the upper end thereof is secured a bevel gear wheel 29, which meshes with a bevel pinion 30. This pinion is keyed upon the end of a short horizontal shaft 31, which forms a part of the crank winding mechanism. This construction is shown in enlarged scale in Figs. 36 and 38, with a slightly modified arrangement of the upper shaft bearing 27$^a$, as compared with that shown in the reduced scale Figs. 1 and 23. This shaft 31 rotates freely in the bearing 27$^a$ and is locked against longitudinal movement therein by the pinion 30, and a positive jaw, clutch-coupling member 32, which is also secured upon the shaft 31, several inches of the shaft extends beyond the face of the clutch member, forming a stud or axial bearing for the corresponding clutch member 33, which takes revoluble and sliding bearing upon this shaft 31. This clutch member has a somewhat elongated hub 33$^a$ by which it is securely keyed upon the end of a crank shaft 34. Adjoining the clutch hub 33$^a$, is a loose yoked sleeve 35, mounted freely upon the shaft 34 between the end of the clutch hub and an adjoining flanged collar 36. This collar is also securely keyed upon the shaft 34. The shaft 34 also takes both free revoluble and longitudinal bearing in a supporting member 37, suitably secured to the car body. Formed upon the upper side of the shaft-bearing of this supporting member 37, is a boss 37$^a$, upon which is mounted a right and left locking pawl 38, designed to engage a ratchet 39, which is securely keyed upon the crank shaft 34. Moving the shaft 34 to the extreme left, brings this pawl and ratchet and the clutch members 32 and 33 into the engaged or operative position as in Fig. 36, while by moving the shaft to the extreme right as in Fig. 38, they are disengaged and in the inoperative position, for the purpose as hereinafter shown. The extreme right hand end of the shaft 34 is formed into a hand crank 40.

The above described construction comprises the attachments adapted to secure, release and raise the discharged doors, providing for the opening of the doors to their maximum limit, permitting of the rapid discharge of the load, ordinarily desirable when dumping coal or ore into bins or chutes. In practice, however, it is frequently necessary that the opening of the discharge doors be controlled, particularly in the case of handling gravel or ballast along the line in road work, where it is desired to distribute the same from a moving car with the doors partly open. We accomplish this result by the use of a foot-brake construction. Referring to Figs. 1, 2 and 23, a band brake wheel 28, of the usual construction is secured upon the counter-shaft 27, from which the friction strap 28ᵃ is secured to a short crank arm 28ᵇ formed upon a transversely disposed rock-shaft 28ᶜ, suitably mounted upon the car frame, upon the ends of which shaft are formed two foot-tread arms 28ᵈ which carry a transverse tread board 28ᵉ, located adjacent the hand-crank, and accessible to the operator when operating either the inner or outer release levers. By applying the brake the dropping of the door can be controlled and brought to a stop in any part of the swing, by the engagement of the brake-retarded crank shaft 22ᵃ, beneath the door and when so stopped can be securely retained by interlocking the pawl 38 and ratchet 39, upon the operatively engaged winding mechanism.

Referring to Figs. 3 and 7, it will be seen that to raise the released doors from the position shown in Fig. 3, which is outward discharge, the operator grasps the coöperating hand crank 40, hanging downward as in Fig. 1, and rotates it outwardly, as indicated in broken lines in Fig. 2. In Fig. 4, which is inward dump rotate the respective hand cranks inwardly. In Fig. 5, the left side door being inward dump rotate the coöperating crank inwardly, the right side door being outer dump rotate the right side crank outwardly. Thus it will be seen that the direction of discharge is a guide to the required movement of the hand crank to return the door, consequently, even though our construction embodies this plurality of dumping positions, confusion on the part of the operator in manipulating the parts is not likely to arise.

If the loaded doors are released and permitted to drop freely their full swing, there is danger of damaging the winding gear construction from the sudden impact of the parts and also of injuring the operator because of the high velocity of rotation attained by the winding mechanism and hand crank if these parts are not first disconnected from the shaft and gear train before the doors are released. To eliminate this danger and secure a positive, automatic disengagement of the winding gear parts, before it is possible to throw the operating levers to release the door hinge fastenings, we provide, the construction shown in Figs. 36 to 47 inclusive, which is located upon the operative end of the car, and shown in part in Figs. 1 and 23, but which, in order to avoid confusion in these reduced scale figures has not been drafted therein in full. This construction is also in duplicate, the two complete sets being shown in part, and connectedly in Fig. 44, in which their coöperative relation with the respective releasing and winding attachments is shown.

A transverse rock shaft 41 suitably supported upon the car body by end and center bearings 41ᵃ, disposed at right angles to, and immediately above the crank shaft 34 has a hook-end locking dog 42, securely keyed thereon, which engages the flanged end of the collar 36, when the crank shaft winding mechanism is in operative position, as shown in Fig. 36. A lug 42ᵃ is formed upon the hub of this locking dog, designed to engage adjacent lugs 43ᵃ, 43ᵃ formed upon two coöperating sleeve yokes or arms 43, 43 Fig. 39, which are mounted loosely upon the shaft 41, adjacent the sides of the locking dog hub and between the central hanger bearings 41ᵃ, 41ᵃ, the ends of these yokes are each jointed respectively to trunnions 35ᵃ, 35ᵃ upon the sides of the sleeve 35. Upon the ends of the rock shaft 41 are formed cranks 41ᵇ, 41ᵇ upon the ends of which and at right angles thereto are formed short crank-pins 41ᶜ, adjoining the operating levers 5, 6, 7 and 8, Figs. 41 to 44, mounted upon which levers adjoining the crank pins 41ᶜ are spring latches or bolts 44, 44, 44, 44 of any preferred detail construction, the latch bolts 44ᵃ of which are designed to automatically engage, and be interlocked by the crank pins 41ᶜ when the levers are moved into the forward or closed position, as in Figs. 1 and 42. Suitably secured adjacent the levers and cranks, when in the closed position are bracket housings 45, Figs. 45, 46 and 47 which form stops for the same and house or inclose the spring bolts 44ᵃ against tampering or maliciously disengaging, as shown by broken lines in Fig. 46, in which construction the inner vertical face 45ᵃ forms the stop for the crank arm 41ᵇ, the outer sloping flange 45ᵇ the stop for the operating lever, and the horizontally disposed central flange 45ᶜ forms the housing inclosing the spring bolt 44ᵃ.

Suitably disposed immediately above the bracket housings, and engaging each of the operating levers are segmental guide bars 46, 46, which maintain the levers and spring bolts in vertical alinement insuring their being carried into positive engagement with the rock-shaft cranks 41ᶜ.

The above described construction comprises the mechanism designed to automatically, positively disengage the winding mechanism from the shaft and gear train, by the initial movement of the operating lever, before releasing the door hinge fastenings.

To provide for locking the entire construction by a single seal or padlock, we form integrally upon the inner ends of the rock shafts 41 horizontal locking arms 47, 47 Figs. 41, 42 and 43, suitably secured and adjacent to the outer ends of which, is a hinge locking bar 48, designed to be turned down over the ends of the arms 47, 47 and engage through a slot 49 formed therein an eye-stud 50 into the eye of which, above the locking bar a car-seal bolt 51, or padlock hasp, as preferred, is inserted. In Fig. 44 we show instead of the hinged locking bar 48, a hooked end locking bar 52, engaging on one end a loop-hinge 53, and upon the opposite or locked end through a locking slot 54 the eye stud 50, as above. It will be understood that with the rock-shafts 41, and crank pins 41ᶜ thus secured and in positive engagement with the housed spring bolts 44ᵃ, that the operating levers cannot be thrown until the locking bar has been disengaged from the locking arms 47.

In view of the foregoing description a brief connected reference as to the operation of the mechanism, will be readily understood. Let it be supposed that the operators wish to dump a load from the two door car, as in Figs. 1 and 2, inwardly, as shown by diagram Fig. 4. Unlocking, or unsealing the hinged locking bar 48 which they turn back from off the locking arms 47, 47, or in the case of the hooked-end locking bar 52, which they slide to the left and permit to drop and hang in the position shown in broken lines in Fig. 44, then, disengaging the respective retaining hooks 9, 9 from the operating levers 6 and 7, these levers are drawn outwardly from the car, upon the initial movement of which the spring bolt 47ᵃ engages the crank-pin 41ᶜ Fig. 42, and as the lever is being carried forward lifts the crank into the position shown in broken lines in Figs. 42 and 46, rotating the rock shaft and with it the hook-dog 42 permanently keyed thereon, which in the first half of this movement is lifted up out of engagement with the flanged collar 36, as shown in broken lines in Fig. 36, meantime the locking lug 42ᵃ has been carried into engagement with the lugs 43ᵃ, 43ᵃ of the loosely fitting yoke arms 43, 43 rotating them during the remainder of the rock-shaft's rotation, carrying the hooked dog 42 from the position shown in broken lines in Fig. 38, idly up to the angle shown in full lines, and meanwhile carrying the yoked sleeve 35, with the crank shaft 34, clutch member 33, collar 36 and ratchet 39 to the extreme right, into the disengaged or inoperative position of the winding mechanism, as shown in Fig. 38, during which movement the ratchet 39 has slid from under the weighted pawl 38, permitting it to drop by gravity a predetermined distance, by the engagement of a stop-stud 38ᵃ with the side of the bearing 37ᵃ, into the position shown in this figure, forming a positive stop in the way of the ratchet 39, preventing thereby the accidental movement to the left of the crank winding mechanism and reëngagement of the clutch jaws at this time; the instant of release of the discharge doors. It will be noted that in making this automatic disengagement of the winding mechanism the shorter arm of the operating lever does not move an appreciable distance toward releasing the hinge locking members. This release movement follows immediately, however, upon carrying the lever to the extreme outward position as shown in broken lines in Fig. 1, disengaging the door hinges upon the inner sides and permitting them to drop as shown in Fig. 4, and discharge the load inwardly. It will be further noted that when the latch bolt passes from under the uplifted crank 41ᶜ and hook-dog 42 these parts drop by gravity being free to rotate with the rock shaft 41 bringing the dog 42 into the position shown in broken lines in Fig. 38, resting upon the top side of the flange collar 36. The load having been discharged, with the operating levers still in the outward position, corresponding with the released position of the hinge members, to return the open doors to the closed position, the operator first lifts the pawl 38 out of the way of the ratchet 39, pushes the crank shaft 34 and winding mechanism into the operatively engaged position shown in Fig. 36, simultaneous with which movement, the hook-dog 42 slides over the flanged end of the collar 36 and drops by gravity into positive engagement against the collar as shown in Fig. 36, securing the winding mechanism in operative position. The load having been discharged inwardly the operator proceeds to turn the hand crank 40, inwardly, adjusting the pawl 38 accordingly in engagement with the ratchet 39. When the empty doors have been carried up to the closed position, and retained by the pawl and ratchet, the operating levers are thrown inwardly, carrying the hinge-locking mechanism into positive engagement with the door beam hinges as has been shown, while the spring bolts 44ᵃ engage the cranks 41ᶜ and spring downwardly, passing under and automatically springing into positive engagement back of the cranks 41ᶜ within the housing 45, simultaneous with which movement the retaining hooks 9, 9 drop into engagement with the respective operating levers 6 and 7, when the locking bar 48 can be secured over the arms 47, 47 as above stated.

It will be understood from the above explanation, that with the winding mechanism in operative position as in Fig. 36, forces exerted longitudinally upon the crank shaft 34, or upon the loosely fitted sleeve yokes 43, 43, do not tend to raise and release the hook-dog 42, consequently, an operator having grasped the hand crank 40 and partly raised the doors, will not, accidentally, disengage the winding mechanism, as he ordinarily might, being swung heavily to and fro against the crank, while operating upon a moving car.

Having thus described our invention, what we claim is:

1. In a dumping car, the combination with the car body and a hinged dumping door forming a part of the car bottom, of pivoted devices for locking the door in the closed position, the said devices having their axes parallel with the hinging axis of the door, an operating rod extending longitudinally of the car body, stationary devices mounted on the car body at suitable intervals and forming supporting guides for the rod which slides freely thereon, an operating lever connected with the rod at one extremity, and a suitable operative connection between the rod and the locking means whereby the door may be locked in the closed position or released at pleasure.

2. The combination with the car body, and a hinged door forming a part of the bottom thereof, of means for locking the door in the closed position, said means including stationary hangers mounted on the car, locking devices pivotally mounted on the hangers, an operating rod supported and guided by the hangers, and an operative connection between the rod and the pivoted locking devices.

3. The combination with the car body and a hinged dumping door, of means for locking the door in the closed position including stationary hangers carried by the car, locking devices pivotally mounted on the hangers, an operating rod supported and guided by the hangers, an operative connection between the rod and the pivoted locking devices, the latter being mounted to swing in vertical planes, the door-engaging parts of the said devices projecting when released, below the plane of the door when closed, thus allowing them to perform the door lifting function to a limited degree when moving to the door-locking position, to overcome any sagging tendency.

4. In apparatus of the class described, the combination with a car body, and a dumping door forming a part of the bottom of the car, of locking means including pivoted devices for locking the door in the closed position, the axes of the locking devices extending lengthwise of the car whereby they swing in vertical planes cutting the car transversely, and means for operating the pivoted locking devices, including a rod extending lengthwise of and suitably supported on the car, and a suitable operative connection between the rod and the pivoted locking devices.

5. The combination with a car body, and a hinged dumping door forming a part of the bottom of the car, of locking means including pivoted devices for locking the door in the closed position, and means for operating the pivoted devices including a rod extending lengthwise of and suitably supported on the car, said rod having a back and forth movement in the direction of the car's length, and a suitable operative connection between the rod and the pivoted locking devices, said connection including toggle links.

6. The combination with the car body, and a door forming a part of the bottom thereof, of means including pivoted devices for locking the door in the closed position, means for operating the pivoted devices including a rod extending lengthwise of and suitably supported on the car, and an operative connection between the rod and the pivoted locking devices, including toggle links and connecting bars, the said bars being directly connected with the rods, and the links being pivotally connected with the bars at one extremity and with the locking devices at the opposite extremity, and means engaging the bars from above for preventing the upward movement of the links.

7. In a construction of the class described, the combination with the car body, and a hinged dumping door, of locking devices pivotally mounted on the car and adapted to lock the door in the closed position, an operating rod, a bar connected with the rod, toggle links connecting the bar with the locking devices, and anti-frictional means mounted above the bar for preventing the upward movement of the links.

8. In a construction of the class described, the combination with the car body, and a hinged dumping door, of locking devices pivotally mounted on the car and adapted to lock the door in the closed position, an operating rod, a bar connected with the rod, toggle links connecting the bar with the locking devices, anti-frictional means for preventing the upward movement of the links, including a stationary channel housing mounted above the connecting bar, and a roller interposed between the housing and the bar.

9. The combination with a car body, and a bottom door hinged to the body and having hinged members extending transversely of the length of the car and protruding from the opening edge of the door, the projecting parts being T-shaped and provided with openings, stationary hangers mounted on the car and fashioned to engage the T-extremities of the door-hinge members, and locking devices pivotally connected with the hangers and coöperating therewith to lock the door in the closed position, the hangers engaging the T-projections of the door hinges, and the pivoted devices entering the openings of the hinge members.

10. In a dumping car, the combination with the car body, of a bottom door extending lengthwise of the car and hinged at its opposite longitudinal edges, stationary hangers mounted on the car adjacent the hinged edges of the door, rods extending lengthwise of the car and supported and guided by the hangers, movable locking devices connected with the rods and coöperating with the hangers to lock the doors in the closed position, and means for operating the rods whereby the door may be released and locked at either of its hinged edges.

11. In a car, the combination of two doors arranged to close openings in the car bottom on opposite sides of its longitudinal center, the said doors being both hinged at their opposite longitudinal edges, hangers mounted on the car adjacent both hinged edges of both doors, movable locking devices coöperating with the hangers to lock the doors in the closed position, rods supported and guided by the hangers and connected in operative relation with the movable locking devices, and means for actuating the rods whereby the doors may be released or locked at either edge.

12. The combination with a car and bottom doors therefor extending longitudinally of the car and arranged end to end, the doors being hinged to open and close independently of each other, means for locking the doors in the closed position at their opening edges, and independent, axially alined rods connected with the locking devices of the respective doors and having no fixed connection with each other, an operating lever, and means for connecting the lever with both rods, the said means being adjustable to permit the rods to be operated simultaneously or independently of each other as may be desired.

13. The combination with a car and bottom doors extending longitudinally thereof and arranged end to end, the doors being hinged to open and close independently of each other, means for locking the doors in the closed position at their opening edges, independent, axially alined rods connected with the locking devices of the respective doors and having no fixed connection with each other, one rod being tubular and the other telescoping therein and passing entirely therethrough, an operating lever, and means for connecting the lever with both rods, the said means being adjustable to permit the rods to be operated simultaneously or independently of each other as may be desired.

14. The combination with a car and hinged bottom doors extending longitudinally of the car and arranged end to end, the doors being hinged to open and close independently of each other, means for locking the doors in the closed position at their opening edges, independent, axially alined rods connected with the locking devices of the respective doors and having no fixed connection with each other, an operating lever, and bars connected with the respective rods and having slotted heads respectively engaging studs projecting from opposite sides of the lever, and means for adjusting the slotted heads whereby they and their connections may be operated simultaneously or independently as may be desired.

15. In apparatus of the class described, the combination with a car and bottom doors extending longitudinally of the car and arranged end to end, the doors being hinged to open and close independently of each other, means for locking the doors in the closed position, independent, axially alined rods connected with the locking devices of the respective doors and having no fixed connection with each other, an operating lever, and bars connected with the respective rods and having slotted heads respectively engaging studs projecting from opposite sides of the lever, the outer end of each slot terminating at its upper side in a recess adapted to receive the locking studs of the lever, the heads being movable to disengage these recesses from the lever studs, to allow the lever to operate either head and its connections independently of the other head.

16. In a construction of the class described, the combination with a car and hinged dumping doors arranged end to end, of means for locking the opening edges of the door in the closed position, independent, axially alined rods connected with the locking devices of the respective doors, an operating lever, and bars connected with the respective rods and having slotted heads respectively engaging studs formed on the lever, the outer end of each slot of each head terminating at its upper side in a recess adapted to receive the locking stud of the lever, the heads being movable to disengage their recesses from the lever studs to allow the lever to operate either head and its connections independently of the other head, and means for locking the disengaged head against longitudinal movement during the movement of the other head.

17. The combination in a car bottom, of a hinged dumping door, means for releasing the door to allow it to swing downwardly to the dumping position, means for closing the door, a manually operated shaft connected in operative relation with the door-closing means, and having a hand crank at one extremity, the hand crank portion of this shaft being movable longitudinally to disconnect it from the geared mechanism, a lever for actuating the releasing means, and a connection between the lever and the operating shaft whereby as the lever is given the door-opening movement, the hand crank extremity of the operating shaft is disconnected from the geared mechanism, to prevent rotation of the hand crank during the opening movement of the door.

18. The combination with a car body having a car bottom provided with a hinged dumping door, means for releasing the door to allow it to swing downwardly to the dumping position, a lever for operating the releasing mechanism, means for closing the door, a manually operated shaft connected in operative relation with the door-closing means, the said shaft having a hand crank at one extremity and being composed of two coöperating clutch members in axial alinement, and means actuated by the door releasing movement of the lever, to disconnect the two clutch members of the manually-operated shaft to prevent the rotation of the crank extremity thereof during the opening movement of the door.

19. In a car having a hinged dumping door, the combination of means for releasing the door, a lever connected in operative relation with the releasing mechanism, means for closing the door, a manually operated crank shaft, a gearing connection between the crank shaft and the door closing means, the crank shaft being composed of two clutch members separable between the gear and the crank extremity of the shaft, and means connected with one clutch member and actuated by the releasing movement of the lever for shifting the said clutch member whereby the crank extremity of the shaft is released from the gear-actuated part, during the opening movement of the door.

20. The combination with a car whose bottom is provided with a dumping door, means for releasing the door, a lever for operating the releasing devices, a door-closing crank shaft, a manually operated crank shaft, an operating gearing connection between the two shafts, the manually operated shaft being composed of clutch members in axial alinement and separable between the gear and the crank, and means operated by the releasing movement of the said lever for shifting one member of the manually operated shaft, to prevent the rotation of the crank during the opening movement of the door.

21. The combination with a car whose bottom is provided with a dumping door, means for releasing the door, a lever for operating the releasing means, a door-closing crank shaft, a manually operated crank shaft, an operating gearing connection between the two shafts, the manually-operated shaft being composed of clutch members in axial alinement and separable between the gear and the crank, a rock shaft extending at right angles to the manually-operated shaft and connected with one member of the latter to shift the same endwise and disconnect the crank member from the gearing member, the rock shaft having a crank lying in the path of the lever when making the releasing movement whereby the rock shaft is actuated to disconnect the members of the manually-operated shaft.

22. The combination with a car whose bottom is provided with a dumping door, of means for releasing the door, a lever for operating the releasing devices, a door-closing crank shaft, a manually-operated crank shaft, an operating gearing connection between the two shafts, the manually-operated shaft being composed of two clutch members separable between the gear and the crank, a rock shaft extending at right angles to the manually-operated shaft and connected with one member of the latter to shift the same endwise and disconnect the crank member from the gearing member, the rock shaft having a dog which holds the clutch members of the manually-operated shaft in the interlocked position, the rock shaft having a crank lying in the path of the said lever when making the releasing movement whereby the rock shaft is actuated to release its dog and disconnect the members of the manually-operated shaft.

23. The combination with a car whose bottom is provided with a dumping door, means for releasing the door, a lever for operating the releasing devices, a door-closing crank shaft, a manually-operated crank shaft, an operating gearing connection between the two shafts, the manually-operated shaft being composed of clutch members in axial alinement and separable between the gear and the crank, a rock shaft extending at right angles to the manually-operated shaft and connected with one member of the latter to shift the same endwise and disconnect the crank member from the gearing member, the rock shaft having a crank lying in the path of the said lever when making a releasing movement, the lever having a spring-actuated latch which slips under the crank of the rock shaft when making the locking movement and engages said crank in operative relation when making the opposite or releasing movement.

24. In a dump car, the combination with the car body and hinged dumping doors forming a part of the bottom of the car and located on opposite sides of its longitudinal center, crank shafts for closing the respective doors, manually-operated shafts having gearing connections with the respective door-closing crank shafts, a rock shaft for disconnecting each manually-operated shaft from the gearing mechanism, means for releasing the dumping doors on each side of the car, each rock shaft having a crank lying in the path of a releasing lever when making the releasing movement, and means for simultaneously locking the several rock shafts against movement to prevent the releasing action of the lever.

25. A car having a central truss beam in its bottom, doors arranged on opposite sides of the truss beam, hinged to open at both longitudinal edges, and having transverse hinge members, hangers mounted on the truss beam and on the outer sides of the car, pivoted locking devices mounted on the hangers and adapted to engage the transverse door-hinge members in locking relation, the said transverse members thus forming tie bars or beams connecting the sides of the car with the central truss beam to prevent bulging of the sides when loaded.

26. In a dumping car, a hinged door forming a part of the car bottom, a crank shaft for closing the door, an operating shaft, an inclined counter-shaft, a gearing connection between the counter-shaft and the two other shafts, a brake wheel on the counter-shaft, a rock shaft having a crank, a brake strap engaging the brake wheel and connected with the crank of the rock shaft, and means for operating the rock shaft for applying the brake.

27. In a dumping car, a hinged door forming a part of the car bottom, a crank shaft for closing the door, an operating shaft, an inclined counter-shaft, a gearing connection between the counter-shaft and the two other shafts, a brake wheel on the counter shaft, a rock shaft having a crank, a brake strap engaging the brake wheel and connected with the crank of the rock shaft, and two foot tread arms attached to the rock shaft and provided with a connecting tread board.

28. In a dumping car, a hinged door forming a part of the car bottom, a crank shaft for closing the door, an operating shaft, a counter-shaft, a gearing connection between the counter-shaft and the two other shafts, a brake wheel on the counter-shaft, a rock shaft having a crank, a brake strap engaging the brake wheel and connected with the crank of the rock shaft, and means for operating the rock shaft for applying the brake.

29. In a dumping car, a hinged door forming a part of the car bottom, a crank shaft for closing the door, an operating shaft, a counter-shaft, a gearing connection between the counter-shaft and the two other shafts, a brake wheel on the counter-shaft, a rock shaft having a crank, a brake strap engaging the brake wheel and connected with the crank of the rock shaft, and two foot tread arms attached to the rock shaft and provided with a connecting tread board.

30. In a dumping car, the combination with the car body and a hinged dumping door forming a part of the car bottom, of pivoted devices for locking the door in the closed position, the said devices having their axes parallel with the hinging axis of the door, an operating rod extending longitudinally of the car body, stationary devices mounted on the car body at suitable intervals and forming supporting guides for the rod which slides freely thereon, an operating lever connected with the rod at one extremity, a suitable operative connection between the rod and the locking means whereby the door may be locked in the closed position or released at pleasure, and means for positively locking the lever in a position corresponding with the closed position of the door.

31. In a dumping car, the combination with the car body and a hinged dumping door forming a part of the car body, of pivoted devices for locking the door in the closed position, the axes of the said devices being parallel with the hinging axis of the door, an operating rod extending longitudinally of the car body, stationary devices mounted on the car body at suitable intervals and forming supporting guides for the rod which slides freely thereon, an operating lever connected with the rod at one extremity, a suitable operative connection between the rod and the locking means whereby the door may be locked in the closed position or released at pleasure, and a latch for positively locking the lever in the position corresponding with the closed position of the door.

In testimony whereof we affix our signatures in presence of two witnesses.

HERBERT T. HERP
JAMES R. GROVES.
DAVID H. FOREMAN.

Witnesses:
EDWARD A. BISHOP,
ARTHUR T. HERR.